(12) United States Patent
Huang

(10) Patent No.: US 10,666,917 B1
(45) Date of Patent: May 26, 2020

(54) SYSTEM AND METHOD FOR IMAGE PROJECTION

(71) Applicant: MSI Computer (Shenzhen) Co., Ltd, Guangdong Province (CN)

(72) Inventor: Yi-Di Huang, New Taipei (TW)

(73) Assignee: MSI Computer (Shenzhen) Co., Ltd, Guangdong Province (CN)

( * ) Notice: Subject to any disclaimer, the term of this patent is extended or adjusted under 35 U.S.C. 154(b) by 0 days.

(21) Appl. No.: 16/286,594

(22) Filed: Feb. 27, 2019

(30) Foreign Application Priority Data

Jan. 19, 2019 (TW) ............................. 108102155 A

(51) Int. Cl.
*H04N 9/31* (2006.01)
*G03B 21/14* (2006.01)

(52) U.S. Cl.
CPC ......... *H04N 9/3185* (2013.01); *G03B 21/147* (2013.01)

(58) Field of Classification Search
CPC .... G03B 21/147; G03B 21/14; H04N 9/3185; H04N 9/3179
See application file for complete search history.

(56) References Cited

U.S. PATENT DOCUMENTS

| 6,520,647 B2 * | 2/2003 | Raskar | G03B 21/00 348/E9.027 |
| 2002/0105623 A1 * | 8/2002 | Pinhanez | G03B 21/28 353/69 |

FOREIGN PATENT DOCUMENTS

| TW | M495541 | 2/2015 |
| TW | M546507 | 8/2017 |

* cited by examiner

*Primary Examiner* — Ryan D Howard
(74) *Attorney, Agent, or Firm* — JCIPRNET

(57) ABSTRACT

A system and method for image projection are provided. The method includes: obtaining, by a processor, a projection image; obtaining, by the processor, a first matrix corresponding to a projection target; converting, by the processor, the projection image into an output projection image for projecting to the projection target according to the first matrix; and projecting, by a projector, the output projection image to the projection target.

8 Claims, 5 Drawing Sheets

SYSTEM AND METHOD FOR IMAGE PROJECTION

CROSS-REFERENCE TO RELATED APPLICATION

This application claims the priority benefit of Taiwan application serial no. 108102155, filed on Jan. 19, 2019. The entirety of the above-mentioned patent application is hereby incorporated by reference herein and made a part of this specification.

BACKGROUND

Technical Field

The disclosure relates to a system for image projection and a method for image projection.

Related Art

Current computer lighting effects are mostly generated by LEDs. However, due to light emitting characteristics of the LEDs, bright spots easily occur, and a light guide carrier or a diffusion sheet is required to evenly distribute the light source. In addition, there are limited variations of LED lighting effects, and only on/off states and color changes can be arranged or combined in design, which can hardly get consumers excited. To improve visual effects, how to project a projection image to a projection target having a height is one of the problems to be solved by those skilled in the art.

SUMMARY

The disclosure provides a system and method for image projection, capable of converting, through matrix operations, a projection image into an output projection image suitable for being projected onto a projection target.

The disclosure proposes a system for image projection, the system including a processor and a projector. The projector is electrically connected to the processor. The processor obtains a projection image. The processor obtains a first matrix corresponding to a projection target. According to the first matrix, the processor converts the projection image into an output projection image for projecting to the projection target. The projector projects the output projection image to the projection target.

In an embodiment of the disclosure, before obtaining the first matrix corresponding to the projection target, the processor pre-stores a plurality of preset matrices corresponding to a plurality of preset motherboards in a storage device.

In an embodiment of the disclosure, the projection target is located on a first motherboard among the plurality of preset motherboards, wherein in obtaining the first matrix corresponding to the projection target, the processor obtains a model number of the first motherboard. According to the model number of the first motherboard, the processor selects the first matrix corresponding to the first motherboard from among the plurality of preset matrices.

In an embodiment of the disclosure, in projecting the output projection image to the projection target, the projector projects the output projection image to a reflective mirror, so as to project the output projection image to the projection target through reflection of the reflective mirror.

In an embodiment of the disclosure, the projection target is a two-dimensional plane or a three-dimensional object.

The disclosure proposes a method for image projection for a system for image projection, wherein the system for image projection includes a processor and a projector. The method includes the following steps. By the processor, a projection image is obtained. By the processor, a first matrix corresponding to a projection target is obtained. By the processor and according to the first matrix, the projection image is converted into an output projection image for projecting to the projection target. By the projector, the output projection image is projected to the projection target.

In an embodiment of the disclosure, the method further includes the following step before obtaining the first matrix corresponding to the projection target. By the processor, a plurality of preset matrices corresponding to a plurality of preset motherboards are pre-stored in a storage device.

In an embodiment of the disclosure, the projection target is located on a first motherboard among the plurality of preset motherboards, and the step of obtaining the first matrix corresponding to the projection target includes the following steps. By the processor, a model number of the first motherboard is obtained. By the processor and according to the model number of the first motherboard, the first matrix corresponding to the first motherboard is selected from among the plurality of preset matrices.

In an embodiment of the disclosure, the step of projecting the output projection image to the projection target includes the following step. By the projector, the output projection image is projected to a reflective mirror, so that the output projection image is projected to the projection target through reflection of the reflective mirror.

In an embodiment of the disclosure, the projection target is a two-dimensional plane or a three-dimensional object.

Based on the above, in the system and method for image projection of the disclosure, through matrix operations, the projection image can be converted into the output projection image suitable for being projected onto the projection target. In this way, projection of lighting effects applied in computers can be enhanced, and limitations of conventional projection due to the height of the projection target can be eliminated. In addition, the use of the reflective mirror significantly shortens a use distance of the projector, such that the projector can be disposed in a less noticeable place.

To make the above features and advantages of the disclosure more comprehensible, examples accompanied with drawings are described in detail as follows.

DESCRIPTION OF THE EMBODIMENTS

Figure 1A:
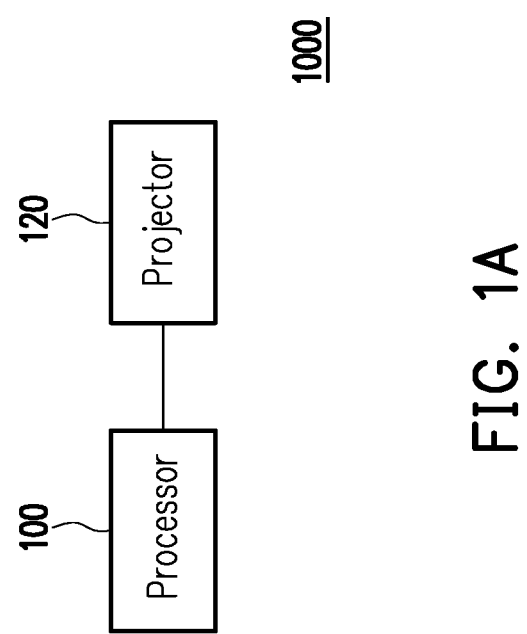
FIG. 1A and FIG. 1B illustrate schematic diagrams of a system for image projection according to an embodiment of the disclosure.

Reference will now be made in detail to the exemplary embodiments of the disclosure, examples of which are illustrated in the accompanying drawings. In addition, whenever possible in the drawings and embodiments, components/members with the same reference numerals represent the same or similar parts.

Figure 1B:
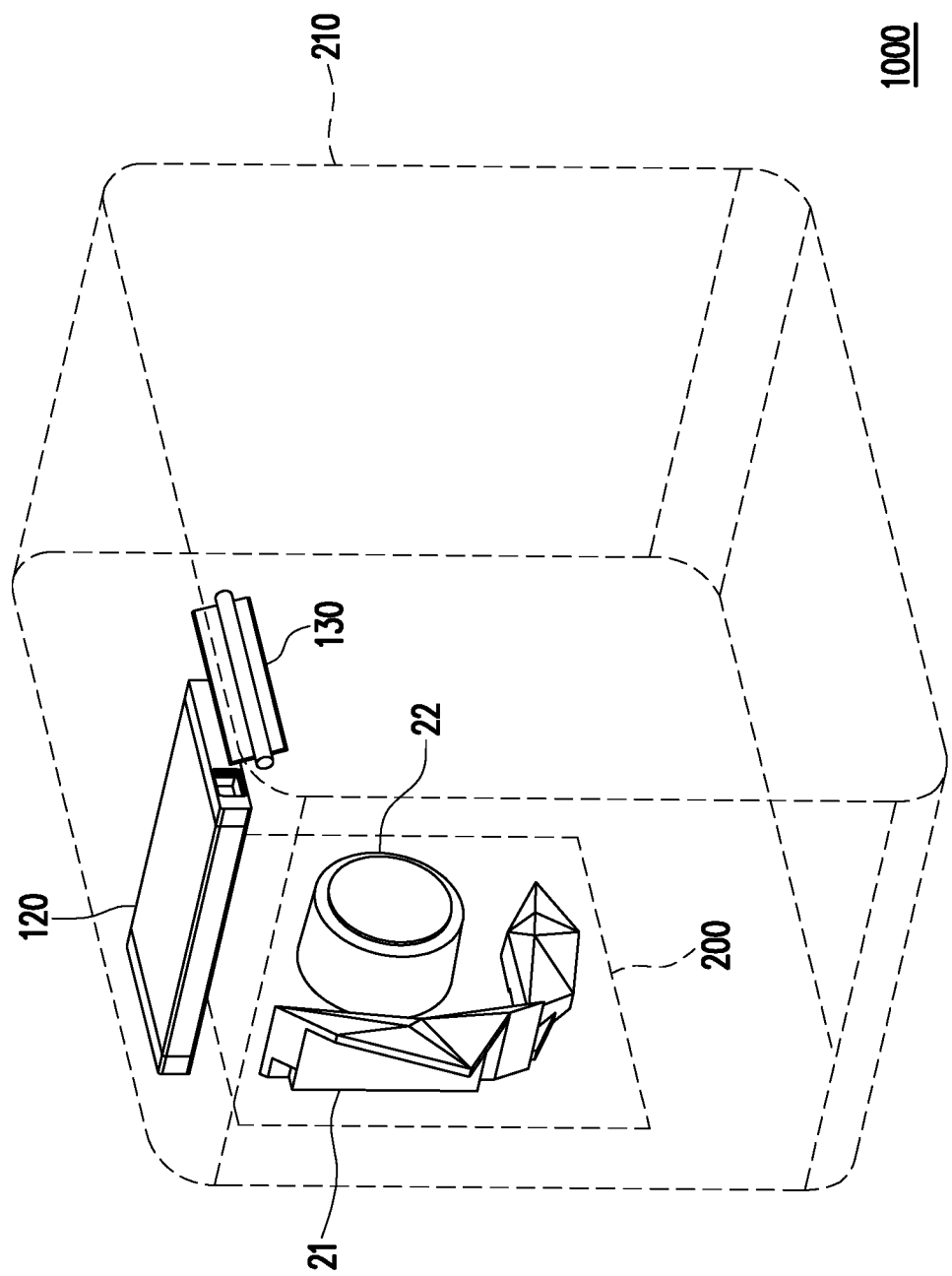

FIG. 1A and FIG. 1B illustrate schematic diagrams of a system for image projection according to an embodiment of the disclosure.

Referring to FIG. 1A, a system 1000 for image projection includes a processor 100 and a projector 120. The projector 120 may be coupled to the processor 100 in a wired or wireless manner.

The processor 100 may be a central processing unit (CPU), or a programmable general purpose or special purpose microprocessor, a digital signal processor (DSP), a programmable controller, an application specific integrated circuit (ASIC) or other similar component or a combination of the foregoing.

The projector 120 may be a general projection device outputting an image in the form of light and imaging it on a plane or an object.

In addition, the system 1000 for image projection further includes a storage device (not shown). The storage device may be any type of fixed or portable random access memory (RAM), read-only memory (ROM), flash memory, hard disk drive (HDD), solid-state drive (SSD) or similar element or a combination of the foregoing.

In the present exemplary embodiment, the storage device of the system 1000 for image projection stores a plurality of code segments therein, and the above code segments are executed by the processor 100 after being installed. For example, the storage device of the system 1000 for image projection includes a plurality of software modules, and operations of the system 1000 for image projection are respectively performed by these software modules, wherein each software module is composed of one or more code segments. However, the disclosure is not limited thereto, and each of the above operations may be implemented in a manner using other hardware or firmware.

In particular, referring to FIG. 1B, in the present exemplary embodiment, the system 1000 for image projection is, for example, disposed inside a casing 210 of a main unit of a desktop computer. For example, the processor 100 may be located on a motherboard 200, and the motherboard 200 may include a heat sink 21 and a water cooler 22. A projector 120 is disposed on a first plane (for example, a top plane inside the casing 210) inside the casing 210, and the motherboard 200 is disposed on a second plane (for example, another plane inside the casing 210 that is perpendicular to the aforementioned first plane) inside the casing 210.

In the present exemplary embodiment, the processor 100 pre-stores a plurality of preset matrices respectively corresponding to a plurality of preset motherboards in the storage device of the system 1000 for image projection. The processor 100 identifies the motherboard 200 (also known as first motherboard) to obtain a model number of the motherboard 200. According to the model number of the motherboard 200, the processor 100 selects a matrix (also called first matrix) corresponding to the motherboard 200 from the aforementioned preset matrices. According to the first matrix, the processor 100 converts a projection image to be projected from a first coordinate system into an output projection image located in a second coordinate system. The output projection image is used for projecting to the motherboard 200 (also known as projection target). Finally, the projector 120 projects the output projection image to a reflective mirror 130, so as to project the aforementioned output projection image onto the motherboard 200 through reflection of the reflective mirror.

It is to be noted that, in the aforementioned example, the aforementioned output projection image is projected onto the motherboard 200 through reflection of the reflective mirror 130. However, in other embodiments, the projector 120 may directly project the output projection image onto the motherboard 200 without through a reflective mirror. In addition, although the "motherboard 200" is used as the projection target in the aforementioned example, in other embodiments, the projection target may not be a motherboard. The projection target may be other two-dimensional plane or a three-dimensional object.

A method for generating the preset matrices corresponding to the preset motherboards is described below. The aforementioned first matrix is described herein, and the other preset matrices can also be generated with reference to the following.

Figure 2:
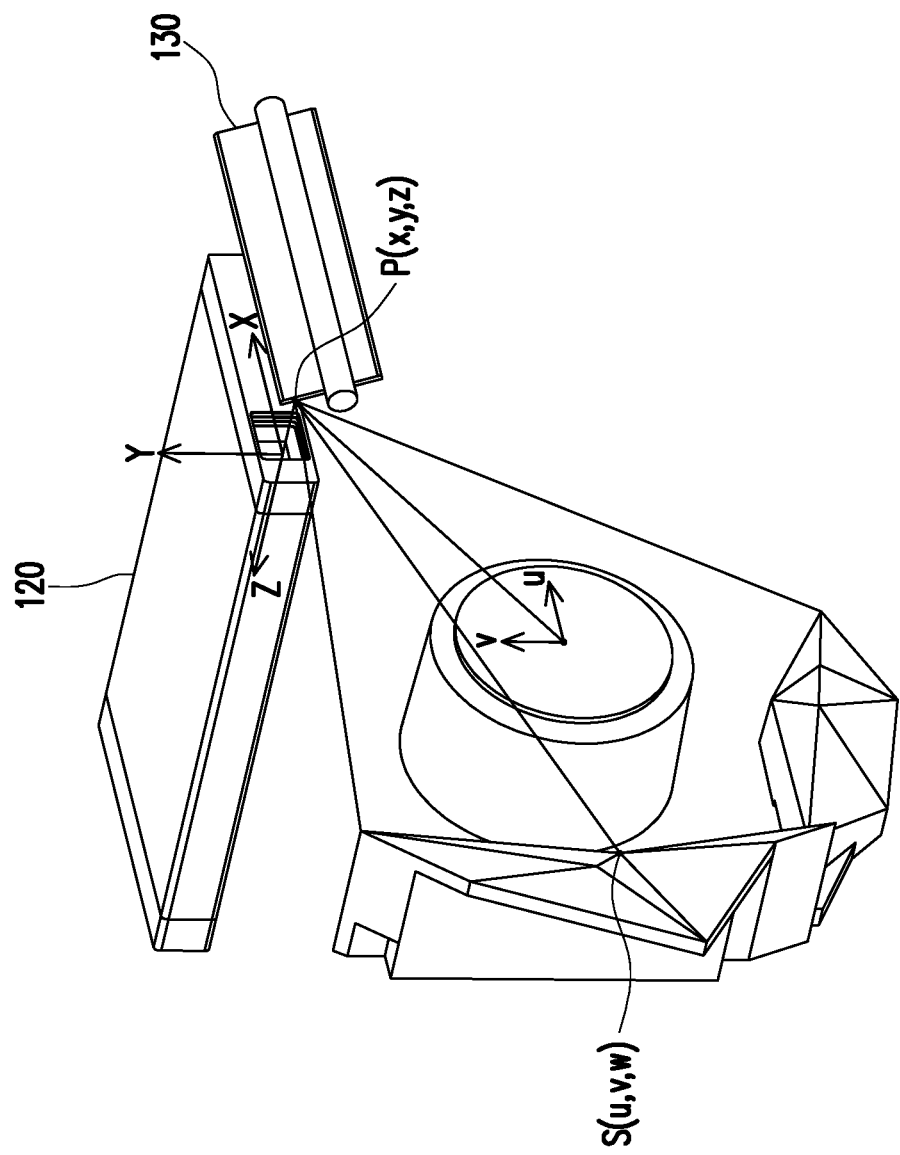
FIG. 2 illustrates a schematic diagram of converting a projection image to an output projection image according to a first matrix according to an embodiment of the disclosure.

In detail, FIG. 2 illustrates a schematic diagram of converting the projection image to the output projection image according to the first matrix according to an embodiment of the disclosure.

Referring to FIG. 2, continuing the example of FIG. 1B, it is assumed that a center point of a lens of the projector 120 for projection is located at the origin of the first coordinate system formed by a vector X, a vector Y, and a vector Z. It is assumed that the output projection image is to be projected into the second coordinate system formed by a vector u and a vector v. In addition, it is assumed that light emitted from the center point of the lens of the projector 120 is reflected at a reflection point of the reflective mirror 130 to the motherboard 200, and the reflection point is located at a coordinate point P (x, y, z) in the first coordinate system. According to the triangle theorem, the following relation (1) can be obtained:

$$\frac{f}{Z} = \frac{u}{X} = \frac{v}{Y} \tag{1}$$

In the relation (1), "X" represents the vector X in the aforementioned first coordinate system, "Y" represents the vector Y in the aforementioned first coordinate system, and "Z" represents the vector Z in the aforementioned first coordinate system. In the relation (1), "u" represents the vector u in the aforementioned second coordinate system, and "v" represents the vector v in the aforementioned second coordinate system. In the relation (1), "f" represents a constant.

According to the aforementioned relation (1), the following relations (2) and (3) can be derived:

$$u = \frac{fX}{Z} \tag{2}$$

$$v = \frac{fY}{Z} \tag{3}$$

For convenience of explanation, it is assumed herein that the value of Z is "1" (i.e., the first coordinate system is a plane formed by the vector X and the vector Y). Accordingly, the aforementioned relations (2) and (3) may be expressed as the following relation (4) in the form of Homogeneous coordinates:

$$\begin{pmatrix} u \\ v \\ w \end{pmatrix} = \begin{pmatrix} f & 0 & 0 \\ 0 & f & 0 \\ 0 & 0 & 1 \end{pmatrix} \begin{pmatrix} X \\ Y \\ Z \end{pmatrix} \quad (4)$$

In the relation (4), "w" represents a vector in the second coordinate system corresponding to the vector Z of the first coordinate system.

In addition, since the motherboard 200 (i.e., the projection target) used for projection may not be limited to a plane, and the vector u and the vector v may need to be appropriately displaced $t_u$ and $t_v$, the aforementioned relations (2) and (3) may be modified as relations (5) and (6), respectively:

$$u = \left(\frac{fX}{Z}\right) + t_u \quad (5)$$

$$v = \left(\frac{fY}{Z}\right) + t_p \quad (6)$$

Accordingly, the aforementioned relations (5) and (6) may be expressed as the following relation (7) in the form of Homogeneous coordinates, by modifying the aforementioned relation (4):

$$\begin{pmatrix} u \\ v \\ w \end{pmatrix} = \begin{pmatrix} f & 0 & t_u \\ 0 & f & t_v \\ 0 & 0 & 1 \end{pmatrix} \begin{pmatrix} X \\ Y \\ Z \end{pmatrix} \quad (7)$$

In particular, the length of the vectors u and v is usually expressed in units of millimeter (mm) or inch (in). However, in a general projection imaging system, a position is usually expressed in "pixels". Therefore, the processor 100 requires resolution of the projector 120 in order to know the number of pixels in each inch (pixels per inch). Normally, the number of pixels per unit differs between directions of the vector u and the vector v (for example, HD 720p means 1080×720 pixels). It is assumed that there are $m_u$ pixels per inch in the direction of the vector u, and there are $m_v$ pixels per inch in the direction of the vector v. Accordingly, by expressing the aforementioned relations (5) and (6) in units of pixel, the relations (5) and (6) can be rewritten as relations (8) and (9), respectively:

$$u = m_u \left(\frac{fX}{Z}\right) + m_u t_u \quad (8)$$

$$v = m_v \left(\frac{fY}{Z}\right) + m_v t_v \quad (9)$$

In addition, the aforementioned relations (8) and (9) may be expressed as the following relation (10) in the form of matrix:

$$\begin{pmatrix} u \\ v \\ w \end{pmatrix} = \begin{pmatrix} m_u f & 0 & m_u t_u \\ 0 & m_v f & m_v t_v \\ 0 & 0 & 1 \end{pmatrix} \begin{pmatrix} X \\ Y \\ Z \end{pmatrix} = \begin{pmatrix} a_x & 0 & u_0 \\ 0 & a_y & v_0 \\ 0 & 0 & 1 \end{pmatrix} P = KP \quad (10)$$

In the above, $a_x$ represents the number of pixels of a focal length in the direction of the vector u, and $a_y$ represents the number of pixels of the focal length in the direction of the vector v. $u_0$ and $v_0$ respectively represent the numbers of pixels of displacement of the origin in the directions of the vector u and the vector v.

In particular, a skew parameter is additionally required in a matrix K in the aforementioned relation (10). The skew parameter is used to adjust a position of a pixel in an imaging coordinate plane in the case where the vector u and the vector v are not perpendicular to each other. In detail, FIG. 3 illustrates a schematic diagram of calculating the skew parameter according to an embodiment of the disclosure.

Figure 3:
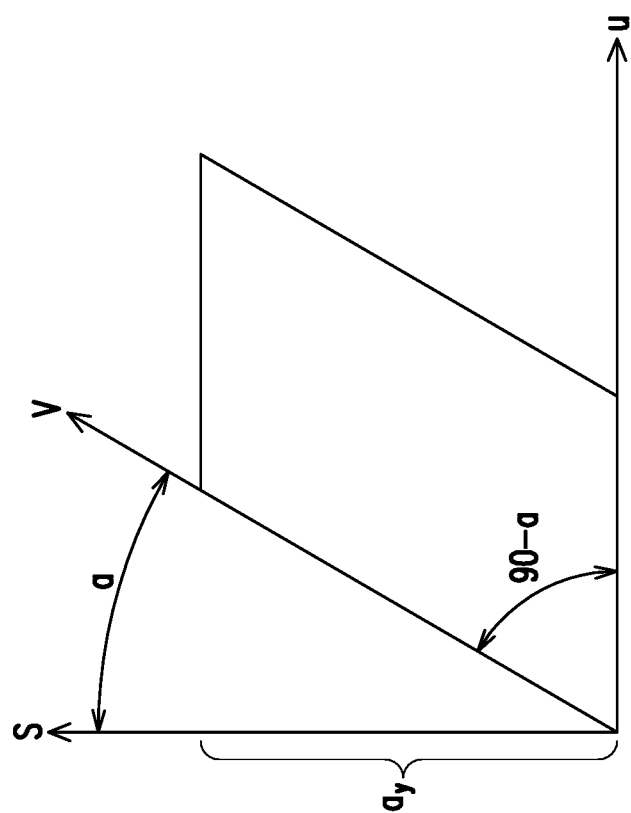
FIG. 3 illustrates a schematic diagram of calculating a skew parameter according to an embodiment of the disclosure.

Referring to FIG. 3, it is assumed that a vector s is perpendicular to the vector u. An angle between the vector u and the vector v is (90−a)°, and an angle between the vector s and the vector v is a°. The skew parameter may be expressed as the following relation (11):

$$s = a_y * \tan(a) \quad (11)$$

In the relation (11), s represents the aforementioned skew parameter, $a_y$ represents a distance of a pixel in a direction perpendicular to the vector u, and a represents the angle between the vector s and the vector v. According to the skew parameter s in the relation (11), the matrix in the relation (10) can be modified into a relation (12) as follows:

$$K = \begin{pmatrix} a_x & s & u_0 \\ 0 & a_y & v_0 \\ 0 & 0 & 1 \end{pmatrix} \quad (12)$$

Referring again to FIG. 2, in the process of converting a position of a coordinate point P (x, y, z) in the first coordinate system into a coordinate point S (u, v, w) in the second coordinate system, in addition to using the matrix K in the aforementioned relation (12), it is also possible to rotate and translate the coordinate point P (x, y, z) using a rotation matrix and an translation matrix. The conversion process is as shown in the following relation (13):

$$s \begin{pmatrix} u \\ v \\ w \end{pmatrix} = \begin{pmatrix} a_x & s & u_0 \\ 0 & a_y & v_0 \\ 0 & 0 & 1 \end{pmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} x \\ y \\ z \\ 1 \end{bmatrix} = K(R|t)Q \quad (13)$$

In the above, $$s \begin{pmatrix} u \\ v \\ w \end{pmatrix}$$

represents the aforementioned coordinate point S (u, v, w) in the second coordinate system, R represents the aforementioned rotation matrix, and this rotation matrix has elements $r_{11}$ to $r_{33}$. t represents the aforementioned translation matrix, and this translation matrix has elements $t_1$ to $t_3$. The rotation matrix and the translation matrix may be combined into a 3*4 external parameter matrix (R|t). Q represents a world coordinate formed by the coordinate point P (x, y, z) in the first coordinate system. In addition, the matrix K may also be called an internal parameter matrix.

Figure 4:
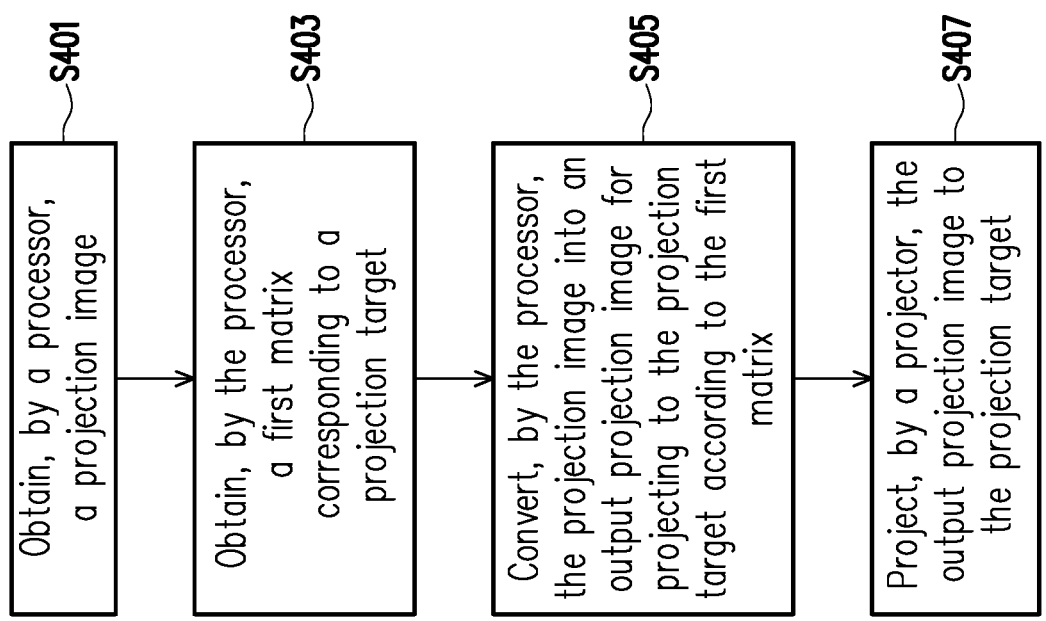
FIG. 4 illustrates a flowchart of a method for image projection according to an embodiment of the disclosure.

FIG. 4 illustrates a flowchart of a method for image projection according to an embodiment of the disclosure.

Referring to FIG. 4, in step S401, the processor 100 obtains a projection image. In step S403, the processor 100 obtains a first matrix corresponding to a projection target. In step S405, according to the first matrix, the processor 100 converts the projection image into an output projection image for projecting to the projection target. Finally, in step S407, the projector 120 projects the output projection image to the projection target.

In summary, in the system and method for image projection of the disclosure, through matrix operations, the projection image can be converted into the output projection image suitable for being projected onto the projection target. In this way, projection of lighting effects applied in computers can be enhanced, and limitations of conventional projection due to the height of the projection target can be eliminated. In addition, the use of the reflective mirror significantly shortens a use distance of the projector, such that the projector can be disposed in a less noticeable place.

Although the disclosure has been described with reference to the above examples, it will be apparent to one of ordinary skill in the art that modifications to the described examples may be made without departing from the spirit of the disclosure. Accordingly, the scope of the disclosure will be defined by the attached claims and not by the above detailed descriptions.

What is claimed is:

1. A system for image projection, comprising:
a processor; and
a projector electrically connected to the processor, wherein
the processor obtains a projection image,
the processor obtains a first matrix corresponding to a projection target,
the processor converts the projection image into an output projection image for projecting to the projection target according to the first matrix, and
the projector projects the output projection image to the projection target,
wherein the projection target is located on a first motherboard among a plurality of preset motherboards, wherein in obtaining the first matrix corresponding to the projection target,
the processor obtains a model number of the first motherboard, and
the processor selects the first matrix corresponding to the first motherboard from a plurality of preset matrices according to the model number of the first motherboard.

2. The system for image projection according to claim 1, wherein before obtaining the first matrix corresponding to the projection target,
the processor pre-stores the plurality of preset matrices corresponding to the plurality of preset motherboards in a storage device.

3. The system for image projection according to claim 1, wherein in projecting the output projection image to the projection target,
the projector projects the output projection image to a reflective mirror, so as to project the output projection image to the projection target through reflection of the reflective mirror.

4. The system for image projection according to claim 1, wherein the projection target is a two-dimensional plane or a three-dimensional object.

5. A method for image projection for a system for image projection, wherein the system for image projection comprises a processor and a projector, the method comprising:
obtaining, by the processor, a projection image;
obtaining, by the processor, a first matrix corresponding to a projection target;
converting, by the processor, the projection image into an output projection image for projecting to the projection target according to the first matrix; and
projecting, by the projector, the output projection image to the projection target,
wherein the projection target is located on a first motherboard among a plurality of preset motherboards, wherein the step of obtaining the first matrix corresponding to the projection target comprises:
obtaining, by the processor, a model number of the first motherboard; and
selecting, by the processor, the first matrix corresponding to the first motherboard from a plurality of preset matrices according to the model number of the first motherboard.

6. The method for image projection according to claim 5, wherein before obtaining the first matrix corresponding to the projection target, the method further comprises:
pre-storing, by the processor, the plurality of preset matrices corresponding to the plurality of preset motherboards in a storage device.

7. The method for image projection according to claim 5, wherein the step of projecting the output projection image to the projection target comprises:
projecting, by the projector, the output projection image to a reflective mirror, so as to project the output projection image to the projection target through reflection of the reflective mirror.

8. The method for image projection according to claim 5, wherein the projection target is a two-dimensional plane or a three-dimensional object.

* * * * *